Jan. 17, 1961   J. O. SHAW   2,968,208
UNDERWATER VIEWING DEVICE
Filed April 29, 1959   2 Sheets-Sheet 1

John O. Shaw
INVENTOR.

BY Clarence A. O'Brien
and Harvey B. Jacobson
Attorneys

Jan. 17, 1961  J. O. SHAW  2,968,208
UNDERWATER VIEWING DEVICE
Filed April 29, 1959  2 Sheets-Sheet 2
Fig.2
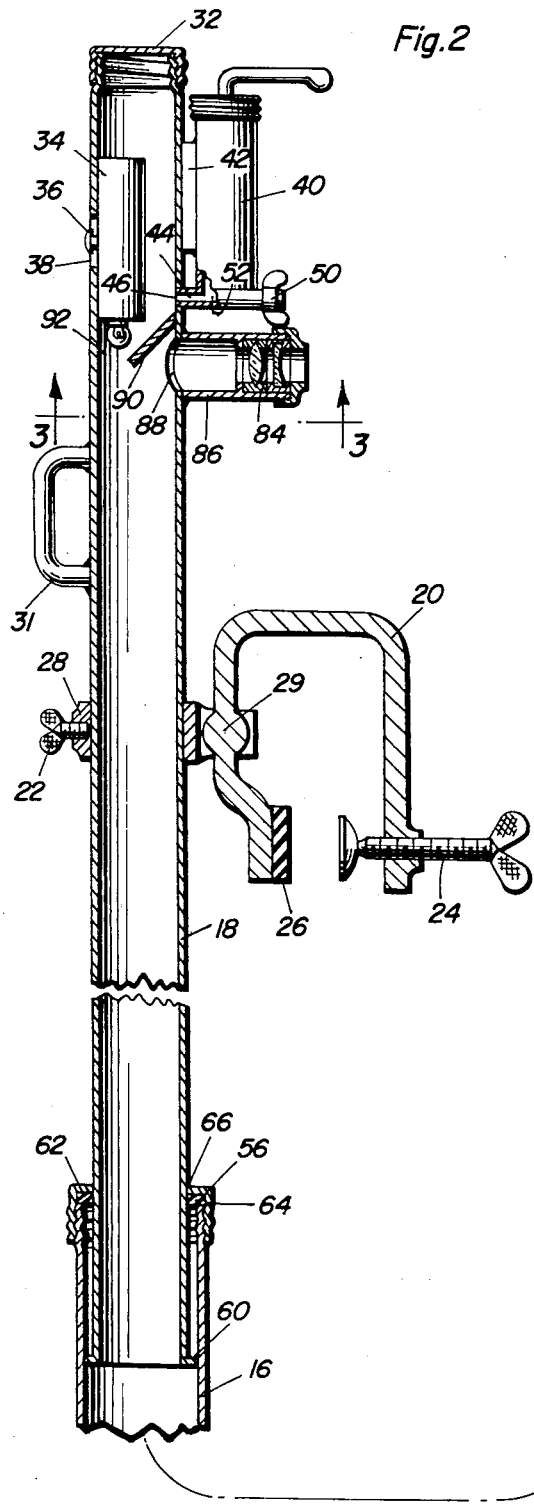
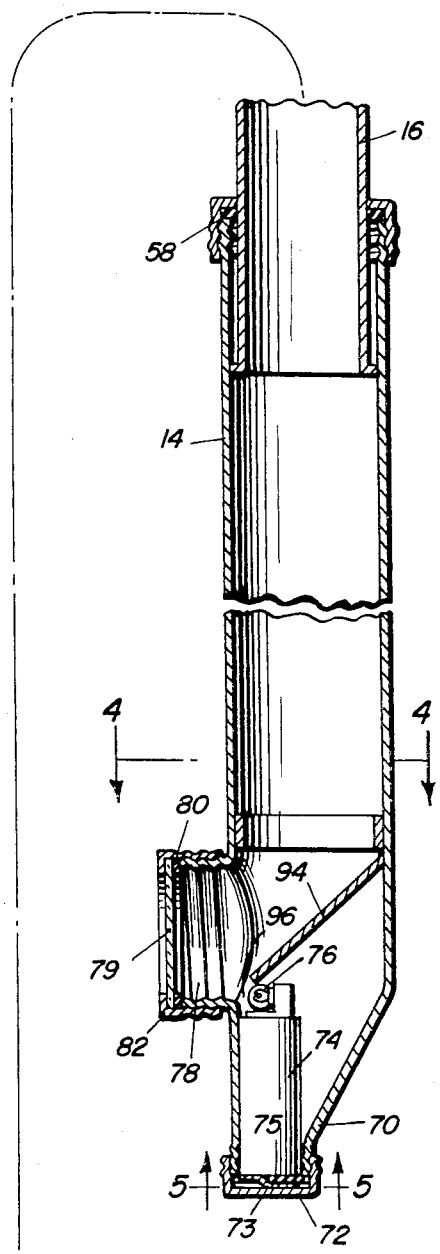
John O. Shaw
INVENTOR

United States Patent Office 2,968,208
Patented Jan. 17, 1961

2,968,208

UNDERWATER VIEWING DEVICE

John O. Shaw, 1017 W. Broadway, Elk City, Okla.

Filed Apr. 29, 1959, Ser. No. 809,778

4 Claims. (Cl. 88—1)

This invention relates to an underwater viewer principally but not exclusively, useful in connection with fishing or underwater detection and study below the water surface.

An object of the invention is to provide an extensible tube with an optical viewing system whereby sub-surface water regions may be explored from above the water level, for instance, from the interior of the boat. The viewer is equipped with a pump by which to extend the tubes, and a lighting system for casting a beam of light in the direction of sight. There are means operatively connected with the viewer for releasing the air under pressure within the viewer that has been applied by means of the pump so that the extensible viewer may be retracted.

A further object of the invention is to provide a device for inspection of sub-surface areas in a body of water, the device being retractable to a compact condition to facilitate storing and handling, and extensible to any selected depth within the limits of the tubes for observation below the surface of the water at any selected level within these limits.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a longitudinal sectional view showing the device, this view having the device separated in a pair of parts thereof so that it may be illustrated on a larger scale.

Figure 3 is a sectional view taken on the line 3—3 of Figure 2.

Figure 4 is a sectional view taken on the line 4—4 of Figure 2.

Figure 5 is a sectional view taken on the line 5—5 of Figure 2.

Figure 1:
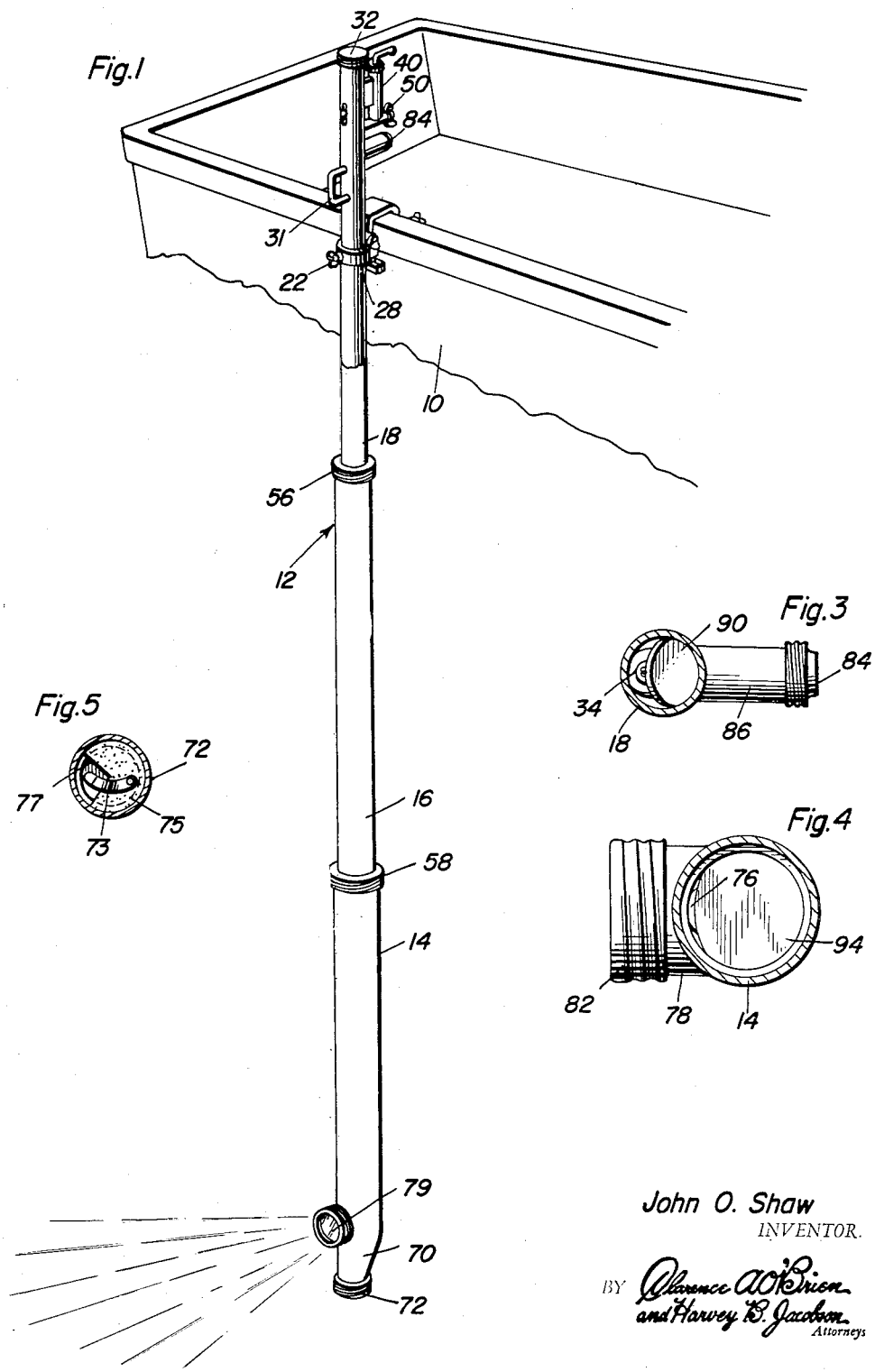
Figure 1 is a perspective view of the device showing it in use.

In the accompanying drawings there is a boat 10 illustrated as a typical place on which to mount the viewer or viewing device 12. The viewing device is made of a plurality of extensibly connected hollow tubes 14, 16 and 18 respectively. Although three tubes are shown, it is evident that this number may be enlarged or decreased. The uppermost tube 18 is equipped with a clamp 20 that is adjustable along the length thereof and held in place by a setscrew 22. Clamp 20 is preferably a C-clamp with a screw 24 to engage a portion of the gunwale of the boat 10, together with a pad 26 to prevent damage to the finish of the gunwale. Collar 28 is connected by ball and socket swivel 29 to one end of the C-clamp and supports set screw 22. The collar has a cylindrical opening which receives the cylindrical tube 18. Handle 31 on tube 18 is used to swivelly adjust device 12 to any desired position with respect to clamp 20.

The upper end of the hollow tube has a cap 32 threaded thereon so that it may be removed for access to the small flashlight 34, the latter preferably being battery powered and provided with a switch 36 extending through a slot 38 in the side wall of the tube 18 so that the flashlight may be turned between the on and off positions.

Manually operated air pump 40 is secured, for instance by mounting bracket 42, to the exterior of tube 18, and it has an air outlet 44 in registry with inlet port 46 in the side wall of tube 18. When the small air pump 40 is actuated, air under pressure is applied to the interior of the tube 18 for the purpose of extending the tubes 14, 16 and 18. Air is released from the hollow tubes by opening manual valve 50 which is operatively connected to port 46 (or an additional port) by way of a passage 52.

Each tube is slidably connected to an adjacent end of an adjacent tube by a similar structure. Identical seals 56 and 58 exclude water from the interior of the tubes. The lower extremity of tube 18 has an outturned flange 60 slidable against the inside surface of tube 16. This flange is a stop flange when brought against the gasket 62 at the upper extremity of tube 16. Gasket 62 is a rubber washer having a central opening through which tube 18 extends. Closure collar 64 is threaded on the upper end of tube 18 and has a central opening 66 through which tube 18 extends. A portion of collar 64 overlies gasket 62. This organization (Figure 2) establishes a sliding, seal connection between tubes 16 and 18. Seal 58 establishes a sliding seal connection between tubes 16 and 14.

The lower end of tube 14 has a reduced diameter portion 70 with a closure cap 72 detachably threaded thereto. Flashlight 74 is attached within the reduced portion 70 of tube 14 and has a lamp 76 at its upper end and in horizontal alignment with light passage 78 which is defined by a collar on the side wall of tube 14. Cap 72 carries contact 73 which wipes over insulating disc 75 held against the bottom battery of the flashlight. When the cap 72 is turned an end of contact 73 passes through disc notch 77 and completes the flashlight circuit. Lens 79 is held against gasket 80 and over the open end of collar 78 by lens retainer 82 threaded on collar 78.

The optical system of the viewing device is composed of an ocular 84 mounted in sleeve 86 in registry with an opening 88 in the side wall of tube 18. A reflective surface device, for instance mirror 90, is attached to the inside surface of tube 18 at approximately a 45° angle to the vision axis through ocular 84. The mirror terminates at a distance spaced from the surface of tube 18 opposite to vision opening 88 to leave space 92 through which light rays from flashlight 34 may pass in a down direction and fall upon mirror 94 or some other device having a light reflective surface. Miror 94 is laterally opposed to the light passage defined by collar 78 but is spaced from the wall of the light passage opposite to that to which mirror 94 is attached thereby leaving a light ray passage 96 through which the light rays from lamp 76 may pass to extend through lens 79. The purpose of both flashlights is to illuminate the underwater area adjacent to the lower end of the viewing device. The rays of light from lamp 76 travel directly through the passage defined by collar 78, while the rays from the flashlight 34 are reflected by mirror 94 through the same passage. With a person's eye placed properly at ocular 84, the line of vision is through sleeve 86, or mirror 90 and mirror 94 and ultimately through the light passage formed by collar 78. Since the tubes are each rotatable with reference to each other, the line of vision may be altered in azimuth by rotation of any one or all of the tubes. Further, the length of the viewer device may be altered by extending and retracting the tubes as desired.

In use, the device may be extended after it is applied to the boat. This is accomplished by the application of pressure in the hollow tubes through the actuation of pump 40. When the desired depth is achieved, this selected depth is retained by a balance of internal air pressure and the friction opposing sliding movement of the tubes with reference to each other, this friction being generated by the seals 56 and 58. In order to retain the viewer device to its retracted position, valve 50 is opened, and the tubes are manually retracted to the nested position, and/or with the aid of external water pressure acting on the bottom part of the lowermost tube.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A viewing device for viewing areas beneath the surface of a body of water, said viewing device comprising a plurality of hollow extensibly connected tubes, seals at the connections between said tubes for excluding water from the hollow tubes and also for generating friction between tubes so that when the tubes are extended or retracted they are maintained in selected positions by the force of friction between tubes, an optical system in said tubes and including an ocular carried by the upper tube together with a lens carried by a lower tube, light reflective surface members in said tubes and opposing said ocular and said lens respectively and oriented to direct the line of vision from the ocular through said tubes and said lens, a first source of illumination in said upper tube and arranged to direct light rays through said lens after reflection from one of said members, a manually operated pump secured directly to one of said tubes in order to inflate said hollow tubes with air under pressure and thereby extend said hollow tubes, said upper tube having a port connected therewith, an outlet valve operatively connected with said port through which air from within the tubes may be discharged, said lower tube having an opening, a second source of illumination in said lower tube, and a closure detachably connected with the opening in covering relationship thereto so that said closure may be removed for access to said second source of illumination.

2. A viewing device for viewing areas beneath the surface of a body of water, said viewing device comprising a plurality of hollow extensibly connected tubes, seals at the connections between said tubes for excluding water from the hollow tubes and also for generating friction between tubes so that when the tubes are extended or retracted they are maintained in selected positions by the force of friction between tubes, an optical system in said tubes and including an ocular carried by the upper tube together with a lens carried by a lower tube, light reflective surface members in said tubes and opposing said ocular and said lens respectively and oriented to direct the line of vision from the ocular through said tubes and said lens, a first source of illumination in said upper tube and arranged to direct light rays through said lens after reflection from one of said members, a manually operated pump secured directly to one of said tubes in order to inflate said hollow tubes with air under pressure and thereby extend said hollow tubes, said upper tube having a port connected therewith, an outlet valve operatively connected with said port through which air from within the tubes may be discharged, said lower tube having an opening, a second source of illumination in said lower tube, and a closure detachably connected with the opening in covering relationship thereto so that said closure may be removed for access to said second source of illumination, the seals at the connections between said tubes each including a gasket circumscribing a portion of one tube which fits into the adjacent portion of the adjacent tube, said seal resting on the outer end surface of said adjacent end of said adjacent tube, a collar attached to said adjacent end of said adjacent tube and having an inwardly directed flange pressing against said seal and holding said seal compressively against said adjacent end of said adjacent tube, and an outwardly directed shoulder on the portion of the first tube fitted into said adjacent end of the adjacent tube and engaging a portion of said seal when the tubes are fully extended.

3. The viewing device of claim 2 wherein a first of said reflective surface members is mounted in said first tube and opposing said ocular, said first member being spaced from a portion of the inner surface of said first tube to provide a light ray passageway for the first source of illumination.

4. The viewing device of claim 3 wherein the second of said reflective surface members is mounted in said lower tube with an edge thereof spaced from the inner surface thereof to provide another light passage through which the light rays from said second source of illumination pass.

References Cited in the file of this patent

UNITED STATES PATENTS

| | | |
|---|---|---|
| 825,241 | Pino | July 3, 1906 |
| 1,175,609 | Cottrell | Mar. 14, 1916 |
| 1,515,065 | Milliken | Nov. 11, 1924 |
| 1,828,924 | Chardell et al. | Oct. 27, 1931 |
| 2,496,430 | Berglund | Feb. 7, 1950 |